Figure 1:
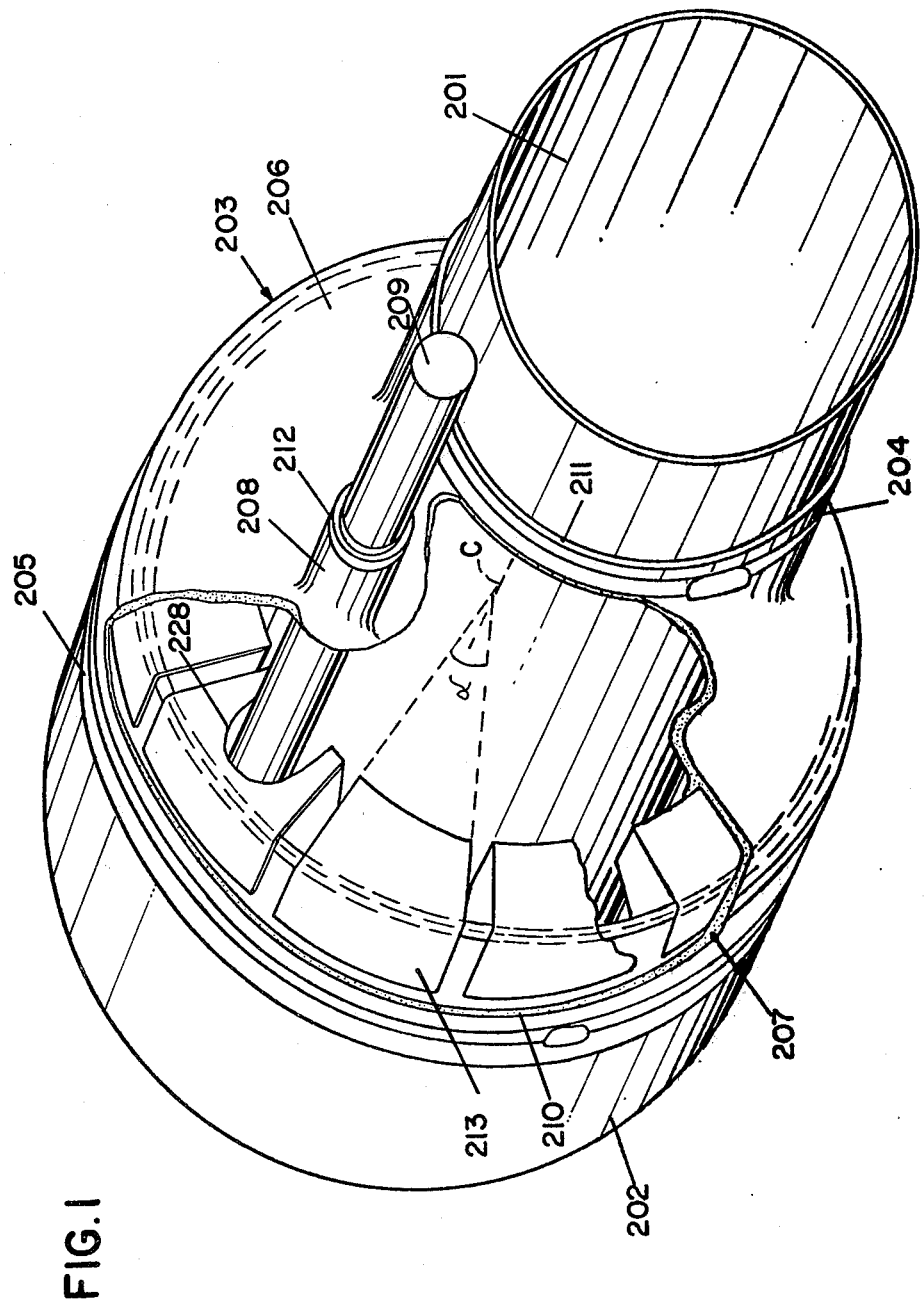

United States Patent [19]
Wegge

[11] 4,180,101
[45] Dec. 25, 1979

[54] DEVICE FOR CLOSING-OFF THE SPACE DEFINED BETWEEN AN INNER PIPE AND AN OUTER SHIELD TUBE

[75] Inventor: Heinrich Wegge, Tegernsee, Fed. Rep. of Germany

[73] Assignee: Wegurit Gesellschaft mbH Pipelinebedarf & Co., Tegernsee, Fed. Rep. of Germany

[21] Appl. No.: 865,154

[22] Filed: Dec. 28, 1977

Related U.S. Application Data

[62] Division of Ser. No. 751,783, Dec. 16, 1976, abandoned.

[30] Foreign Application Priority Data

Dec. 12, 1975 [DE] Fed. Rep. of Germany ... 7540266[U]

[51] Int. Cl.$^2$ .................. F16L 57/00; F16L 58/00
[52] U.S. Cl. .................. 138/103; 138/109; 138/113; 138/114; 138/149; 174/74 A; 174/93; 277/212 FB; 285/138
[58] Field of Search .............. 285/47, 138; 138/109, 138/113, 114, 149, 103, 106, 99, 96 R, 89, 148, 178; 174/74 R, 74 A, 93; 277/101, 207 A, 212 FB

[56] References Cited

U.S. PATENT DOCUMENTS

| | | | |
|---|---|---|---|
| 2,545,030 | 3/1951 | Isenberg | 138/109 X |
| 2,664,112 | 12/1953 | Isenberg | 138/113 |
| 2,695,254 | 11/1954 | Isenberg | 138/109 |
| 2,919,721 | 1/1960 | Isenberg | 138/109 |
| 3,254,153 | 5/1966 | Kohler | 174/93 |
| 3,518,358 | 6/1970 | Brown | 174/93 X |
| 3,583,710 | 6/1971 | Burelle | 138/114 X |
| 3,854,756 | 12/1974 | Couch | 285/47 |
| 4,015,072 | 3/1977 | Gillemot | 174/93 X |

FOREIGN PATENT DOCUMENTS 997640 1/1952 France .................... 174/74 A

Primary Examiner—Richard E. Aegerter
Assistant Examiner—James E. Bryant, III
Attorney, Agent, or Firm—Ladas, Parry, Von Gehr, Goldsmith & Deschamps

[57] ABSTRACT

A device for closing off the space defined between an inner pipe and an outer shield tube comprises a sleeve of flexible resilient material having one end portion whose internal diameter is substantially equal to the external diameter of the inner end, a second end portion whose internal diameter is substantially equal to the external diameter of the shield tube, and an intermediate portion of substantially frusto-conical form joining the first and second end portions. The sleeve also has a tubular appendix which is joined to the intermediate portion of the sleeve and extends substantially parallel to the axis of the inner pipe and the shield tube for accomodating a signal transmitting cable. Angle plates are provided, with each having an axial portion extending over the extension of the shield tube at one end thereof and a radial portion extending at least part of the way from the axial portion across the clearance between the shield tube and the inner pipe.

9 Claims, 4 Drawing Figures

DEVICE FOR CLOSING-OFF THE SPACE DEFINED BETWEEN AN INNER PIPE AND AN OUTER SHIELD TUBE

This is a division of application Ser. No. 751,783 filed Dec. 16, 1976 and now abandoned.

The present invention relates to a sealing device for closing-off the space defined between an inner pipe and an outer shield tube.

If a pipe for conveying a product is inserted into a protective shield tube, problems are encountered especially with pipes having a larger diameter, e.g., diameters from 1 to 2 m, because there is the risk that the outer coating of the inner pipe may be damaged when said pipe is admitted into the shield tube. In practice, it is only rarely possible to install such a shield tube in such a manner that its axis will form an exact straight line. During installation, this shield tube becomes often distorted or twisted which makes the insertion of the product pipe more difficult. However, a damaged product pipe may result in serious consequences because creeping currents may form between the inner pipe and the shield tube due to electric voltages. Such sneak currents will ultimately destroy the pipes.

Therefore, it is of importance that the inner pipe segment should be inserted without damage to its outside coating, and should be kept upon its insertion with a spacing from the shield tube. It is moreover important that the two ends of the shield tube, which tube has a larger diameter than the product pipe, should be sealed with respect to the product pipe. Said sealing device should, on the one hand, prevent moisture from entering into the intermediate space between the product pipe and the shield tube, and on the other hand, be deformable to a certain extent because it is hardly possible in practice to install the inner pipe precisely concentrically to the shield tube.

The sealing device according to the present invention achieves both the safe sealing against moisture and the required mobility for positioning the inner pipe. Moreover, said sealing device also permits the installation or insertion of a signal line transmitting, for example, information for monitoring the condition of the installation, or facility.

According to the invention, this problem is solved by forming a sealing sleeve from yielding, elastic material in such a way that said sleeve comprises a substantially conical center portion between two cylindrical end portions. The diameters of said end portions are adapted to the diameters of the inner pipe and the shield tube: said conical center portion provides for the transition between said two end portions. Since said sealing sleeve is made of flexible material, said center portion is capable of deforming like a bellows when the inner pipe becomes displaced and thus permits slight changes in the position of the inner pipe relative to the shield tube. So that the signal line may be installed, said sleeve is provided in its conical portion with a pipe socket or nipple formed from the same material, the inside diameter of said socket conforming to the outside diameter of the signal transmission line.

Since said sealing sleeve extends across the outer edge of the shield tube which normally has sharp portions, the present invention provides for elbows which are attached over the entire circumference of one rim of the shield tube, preventing any direct contact between the sealing sleeve and the sharp edges of the shield tube rim. Moreover, the sleeve may support itself on said elbows when the inner pipe displaces itself too far into the shield tube.

Said elbows consist of an axial section resting on the outer surface of the marginal portion of the shield tube, and a section extending in radial direction, said latter section supporting the inner pipe and at the same time limiting radial displacements of said inner pipe. Said radially extending section is provided with lateral edges bent in axial direction. These bent lobes form a slot together with the axially extending portion of the elbow, the width of said slot approximately corresponding with the thickness of the wall of the shield tube, so that prior to the installation of the sealing sleeve, said elbows may be clamped onto the shield tube along its circumference. The edge disposed between the axial and the radial sections of the elbow is usefully curved in such a way that it is adapted to the curvature of the shield tube. Also the axially extending portion of the elbow is preferably provided with the same curvature. The angle between the axial and radial portions of the elbow is preferably less than 90°, in which case the width of the slot decreases from the inside toward the outside, so that the elbow must first be slightly opened by bending before it is clamped or slipped onto the shield tube. After it has been slipped on or clipped on, it is retained on the shield tube by the clamping effect and may support also, if needed, the center portion of the sealing sleeve. Also a slightly resilient material may be selected for the elbow.

After the sealing sleeve has been installed, one or a plurality of hose clamps are attached to the cylindrical portions, which clamps, for example, may be stainless steel bands. Said bands or straps may then be tensioned in the usual manner.

The sealing may be achieved also in a different manner, namely by providing two sealing sleeves, one placed on top of the other, and filling the intermediate space with a foam material. This type of sealing permits a particularly simple and quick installation. These sleeves may be secured by first mounting the inner sleeve, thereafter the outer sleeve, and subsequently forcing in the foamlike filler. This arrangement may then be secured at various points, or the sleeves are installed overlapping each other, so that only one single securing means is required, e.g. a clamping strap for both the inner and outer sleeves.

Figure 2:
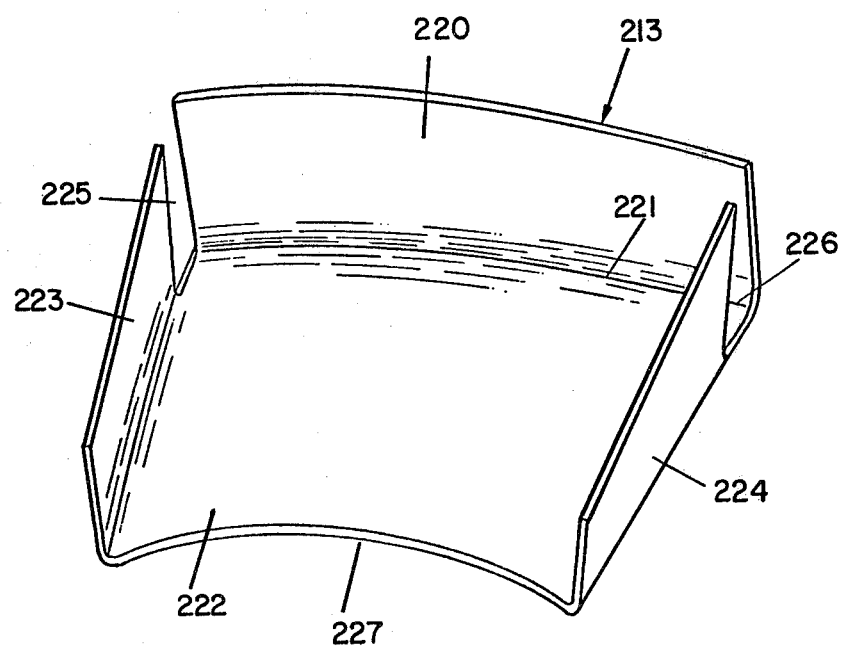
Figure 3:
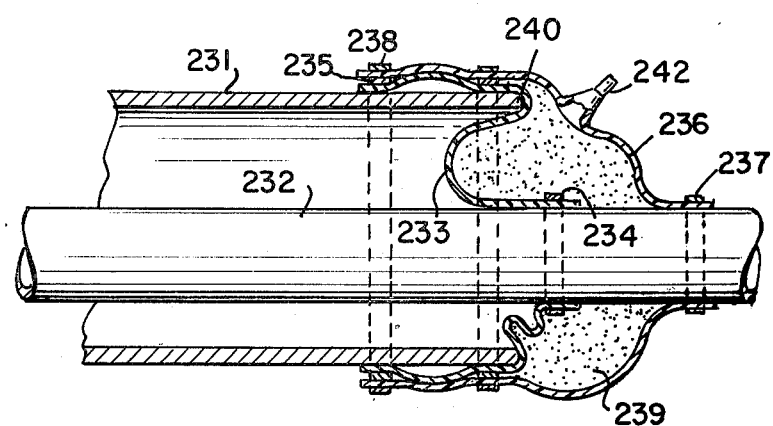
Figure 4:
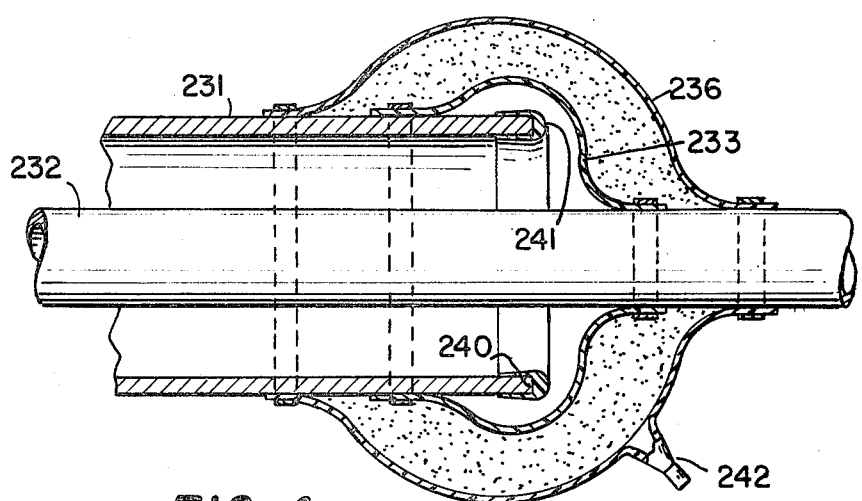

Embodiments of the pipe sealing arrangement according to the invention are described by way of example with the help of the attached drawings in which:

FIG. 1 in perspective view a first sealing device showing only part of the sealing sleeve so that the arrangement of angle plates may be viewed;

FIG. 2 shows an angle plate in detail;

FIG. 3 a double sleeve sealing device with two attachments on the product pipe and one on the shield tube;

FIG. 4 a similar arrangment, however with separate attachments.

FIG. 1 shows an inner pipe 201 pushed into a shield tube 202; the pipes are connected with each other by a sealing sleeve 203. Said sealing sleeve has a more narrow cylindrical portion 204 surrounding the inner pipe 201, and a wider cylindrical portion 205 surrounding the shield tube 202. The center portion 206 of said sleeve extends substantially conically and may be compressed like a bellows as shown at point 207. A socket-type section 208 serves for accommodating a signal-transmitting line 209. All cylindrical portions, namely the wider portion 205, the more narrow portion 204 and the cylindrical portion of socket pipe 208 are provided with clamping bands 210, 211 and 212, which clamping bands provide for the actual sealing. Said bands may be attached directly to said cylindrical portions; however, it will facilitate the installation work if said bands are placed onto markings provided on said cylindrical sections, which markings may be shallow grooves into which said clamping bands may be placed.

The angle plates are shown in detail in FIG. 2. Said angle plates have an axial portion 220 and a radial portion 222 which are joined at a bend 221. The marginal portions 223 and 224 of radial portion 222 are bent over at substantially right angles and together with the axial portion 220 form the slots 225 and 226. The width of the slots decreases toward the open end of the slot so that one must slightly bend the slots open when the elbow or angle plate is clamped, so that a safe clamping effect is achieved in this manner. The bend 221 has a curvature corresponding with the curvature of the shield tube; while edge 227 is usefully also curved in a manner conforming to the curvature of the inner pipe. However, the radial portion need not necessarily be sufficiently large to have the inner pipe rest closely against said section. Said radial portion may also be shorter so that said inner pipe will be provided with a certain radial mobility. FIG. 1 shows that one of the angle plates may have a recess 228 so that the signal-transmitting line may be installed near the inner wall of the shield tube. As illustrated in FIG. 1, the angle α subtended by the axial portion 220 and the radial portion 222 of the angle plate at the central axis C of the shield tube is less than 90°.

A sealing device comprising a double sleeve is shown in FIGS. 3 and 4.

A shield tube 231 encloses a product pipe 232. At the open end of the shield tube 231, the latter and the product pipe are sealed off against each other by a sealing device. Said sealing device consists of an inner sleeve 233 secured on the inner pipe by means of a clamping band 234 and on the outer tube by means of a clamping band 235. An outer sleeve 236 is placed over said inner sleeve, which outer sleeve also is secured on the inner pipe by means of a clamping band 237 and on the shield tube by means of a clamping band 238. The space between said two sealing sleeves is filled with foam 239 admitted into said space under pressure.

If the product pipe is disposed not exactly centrically within the shield tube, which is often the case in practice, the sleeve, and especially the inner sleeve of this type of a sealing arrangement may deform as shown in the lower portion of FIG. 3. However, complete sealing is maintained in spite of such deformation. The embodiment shown in FIGS. 3 and 4 comprises an inner and outer sleeve each secured by their own clamping bands on the associated pipes; however, both sleeves may be placed one on top of the other on the shield tube and/or the product pipe, in which case the two sleeves may be jointly secured by one common clamping band. Usefully, a plurality of clamping bands is used as shown in FIG. 4. The edge 240 of the end of shield tube 231 is rounded off; furthermore, it is desirable to place over said edge an edge protection member 241 so as to safely prevent the inner sealing sleeve from becoming chafed at that point.

The foam material is admitted through a valve opening 242 provided on the outer sealing sleeve.

I claim:
1. In combination, a pipe for conveying a product, a shield tube in which the pipe may be inserted with clearance, angle plates each having an axial portion extending over the exterior of the shield tube at one end thereof and a radial portion extending in use at least part of the way from said axial portion across said clearance between the shield tube and the pipe, and a sealing device for sealing the clearance between the pipe and the shield tube at said one end of the shield tube, the sealing device comprising a sleeve of flexible resilient material having a first end portion whose internal diameter is substantially equal to the external diameter of the pipe, a second end portion whose internal diameter is substantially equal to the external diameter of the shield tube, and an intermediate portion of substantially frusto-conical form joining the first and second end portions, and the sleeve also having a tubular appendix which is joined to the intermediate portion of the sleeve and extends in use substantially parallel to the axes of the pipe and shield tube for accommodating a signal-transmitting cable.

2. A combination as claimed in claim 1, wherein the radial portion of each angle plate has two marginal regions extending substantially radially, the marginal regions being bent in the axial direction to define, with the axial portion, respective slots, the radial width of each slot being substantially equal to the wall thickness of the sheild tube.

3. A combination as claimed in claim 3, wherein the axial portion and the radial portion of each angle plate are dimensioned to subtend an angle of less than 90° at the axis of the shield tube.

4. A combination as claimed in claim 1, wherein the radially-innermost edge of the radial portion of each angle plate is curved, the radius of curvature of said edge being substantially equal to the radius of curvature of the external surface of said pipe.

5. A combination as claimed in claim 1, wherein the radially-outermost boundary of the radial portion of each angle plate is curved, the radius of curvature of said boundary being substantially equal to the radius of curvature of the external surface of the shield tube.

6. A combination as claimed in claim 1, wherein the tubular appendix and the first and second end portions of the sleeve are provided with markings for indicating the desired location of clamps for securing the appendix and the first and second end portions of the sleeve in position.

7. A combination as claimed in claim 6, wherein the markings are shallow grooves of annular form extending around the tubular appendix and the first and second end portions of the sleeve.

8. A combination as claimed in claim 6, wherein the clamps for securing the tubular appendix and the first and second end portions in position are hose clamps made of stainless steel.

9. In combination, a pipe for conveying a product, a shield tube through which the pipe extends with clearance, and a sealing device which seals the clearance between the pipe and the shield tube at one end of the shield tube, the sealing device comprising two flexible sleeves each secured both to the shield tube and to the pipe, one of the sleeves extending over the other sleeve and a space being defined between the sleeves, and the device also comprising foam material filling said space between the sleeves.

* * * * *